Feb. 27, 1962   J. C. M. FROST ET AL   3,022,963
DISC-TYPE AIRCRAFT WITH PERIPHERAL JET CONTROL
Original Filed May 9, 1955   5 Sheets–Sheet 1

INVENTORS
J. C. M. FROST
T. D. EARL
BY *Maybee & Legris*
ATTORNEYS

Feb. 27, 1962     J. C. M. FROST ET AL     3,022,963

DISC-TYPE AIRCRAFT WITH PERIPHERAL JET CONTROL

Original Filed May 9, 1955     5 Sheets-Sheet 3

INVENTORS
J. C. M. FROST
T. D. EARL

BY *Maybee & Legris*

ATTORNEYS

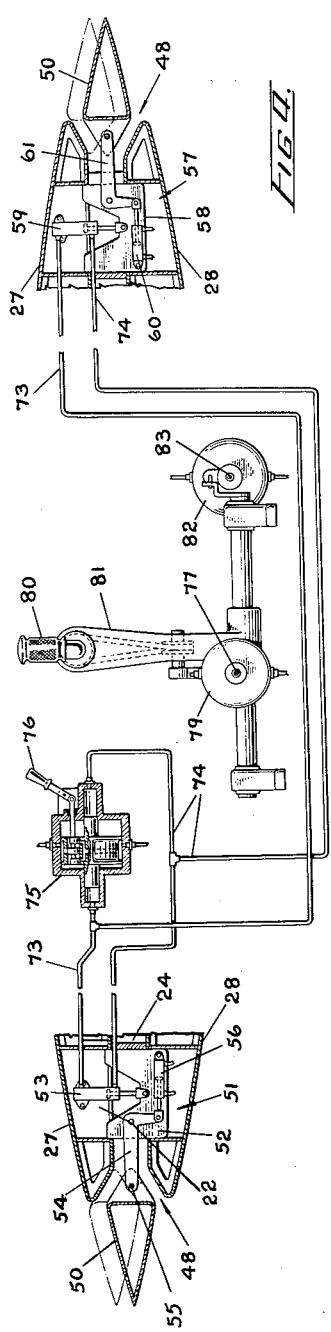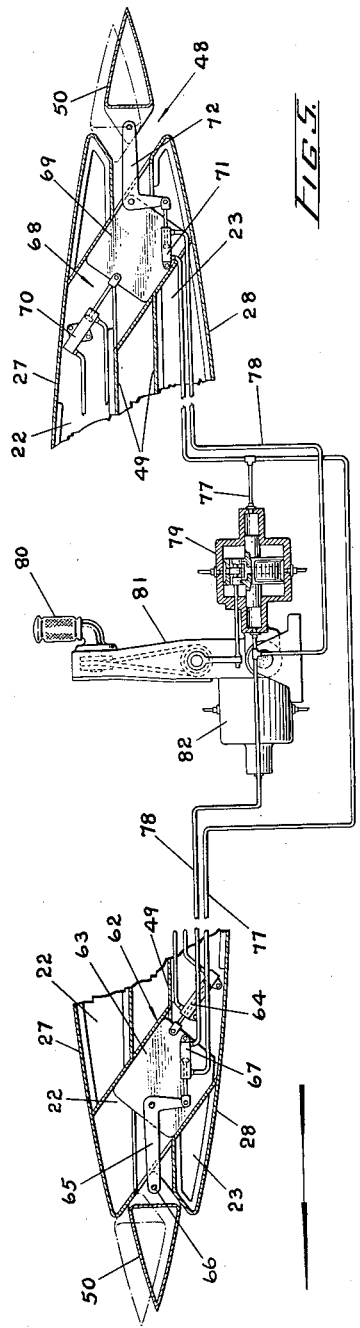

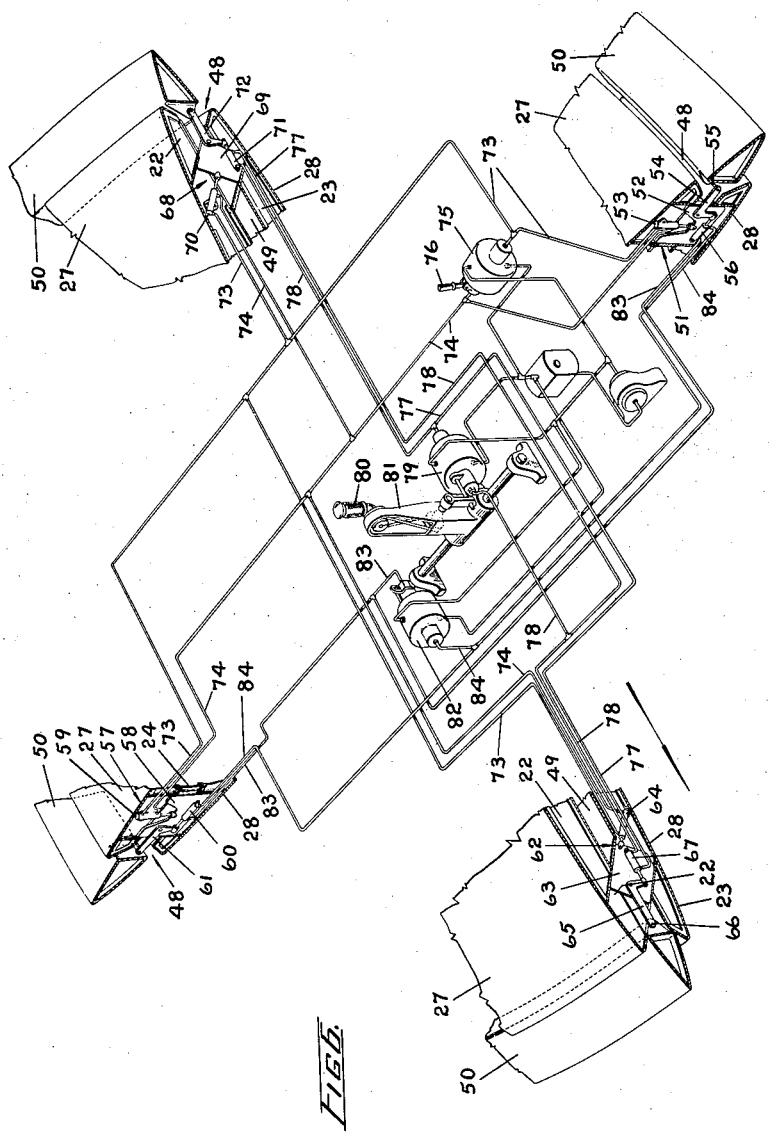

United States Patent Office 3,022,963
Patented Feb. 27, 1962

3,022,963
DISC-TYPE AIRCRAFT WITH PERIPHERAL
JET CONTROL
John Carver Meadows Frost, Georgetown, Ontario, and Thomas Desmond Earl, Glen Williams, Ontario, Canada, assignors, by mesne assignments, to Avro Aircraft Limited, Malton, Ontario, Canada, a corporation of Canada
Continuation of application Ser. No. 507,098, May 9, 1955. This application Oct. 1, 1957, Ser. No. 688,804
Claims priority, application Great Britain May 11, 1954
23 Claims. (Cl. 244—15)

This application is a continuation of our application Serial No. 507,098, filed May 9, 1955, now abandoned.

The invention relates to the propulsion and control of disc-type or circular aircraft deriving a propulsive thrust from a stream of high speed gases flowing within the aircraft in generally radial directions and discharged from the periphery thereof. An aircraft of this type is disclosed in the co-pending patent application of John Dubbery, John Carver Meadows Frost and Thomas Desmond Earl, Serial No. 684,615, filed on September 17, 1957.

The co-pending application Serial No. 684,615 describes an aircraft which comprises a structure of generally lenticular form and which is sheathed by opposed aerofoil surfaces converging towards each other in an outboard direction from their central inboard portions to their perimetrical edges, and a radial flow gas turbine engine disposed between the said aerofoil surfaces and having a disc-like rotor the plane of rotation of which is approximately parallel to the medial plane between the said opposed surfaces. Air enters inlets provided in the aerofoil surfaces, then after passing through plenum chambers it flows radially outboardly through a double-sided multi-stage radial flow compressor of a gas turbine engine, then into an annularly arranged combustion system of the engine where it supports the combustion of the fuel and from which the products of combustion or gases expand through a radial flow turbine of the engine into a peripheral passage, whence they flow radially outboardly through a perimetrical orifice which forms a constituent part of a Coanda nozzle. The Coanda nozzle is constituted by a gap defined by the perimeter of the upper aerofoil surface and by the upper surface of a hollow toroidal element which perimetrically encompasses the aerofoil surfaces and the lower surface of which blends with the lower aerofoil surface. The gases issuing from the passage are deflected around the toroidal element and adhere to its surface. Co-operating with the Coanda nozzle are means whereby the entrainment on one side of the orifice may be varied selectively at various sectors, and means whereby various sectors of the orifice selectively may be obstructed in toto or in part. More specifically, circumferentially spaced holes are provided in the upper surface of the toroidal element and they are connected through valves responsive to the pilot's controls to an air supply of the engine. By the selective adjustment of the controls the pilot can cause air to be admitted to any desired group of holes, thereby varying selectively the direction and magnitude of the jet emitted in various sectors of the peripheral nozzle, to provide control of the aircraft.

The above described arrangement has been found in practice to cause excessive drag at supersonic speeds. Furthermore, in forward flight, the gases issuing from the forward portion of the aircraft are caused to flow along the under surface of the aircraft and so prevent the use of an air intake on that surface. Consequently, an air intake can be provided only on the upper surface of the aircraft, and as a result of this lack of symmetry large pitching moments may be set up at supersonic speeds.

The main object of the invention is to provide an improved method of propelling and controlling a disc-type aircraft, and of initiating its take-off.

Another object of the invention is to provide control means for a disc-type aircraft which will minimize drag at supersonic speeds.

A further object of the invention is to provide control means for a disc-type aircraft which allows the use of upper and lower air intakes.

The foregoing and other objects and advantages of the invention will become apparent from a study of the following specification, taken in conjunction with the accompanying drawings, in which like reference characters indicate corresponding parts throughout the several views, and in which:

FIG. 4 is a fragmentary diametrical cross-sectional view of the aircraft, as indicated by the lines 4—4 of FIG. 1, and showing the port and starboard outboard portions and only the relevant pilot's controls in the central portion;

FIG. 5 is a fragmentary diametrical cross-sectional view of the aircraft, as indicated by the lines 5—5 of FIG. 1, and showing the fore and aft outboard portions and only the relevant pilot's controls in the central portion; and FIG. 6 is a fragmentary perspective view of the aircraft, partly in section and partly in schematic form, and intended particularly to illustrate the control system.

Figure 1:
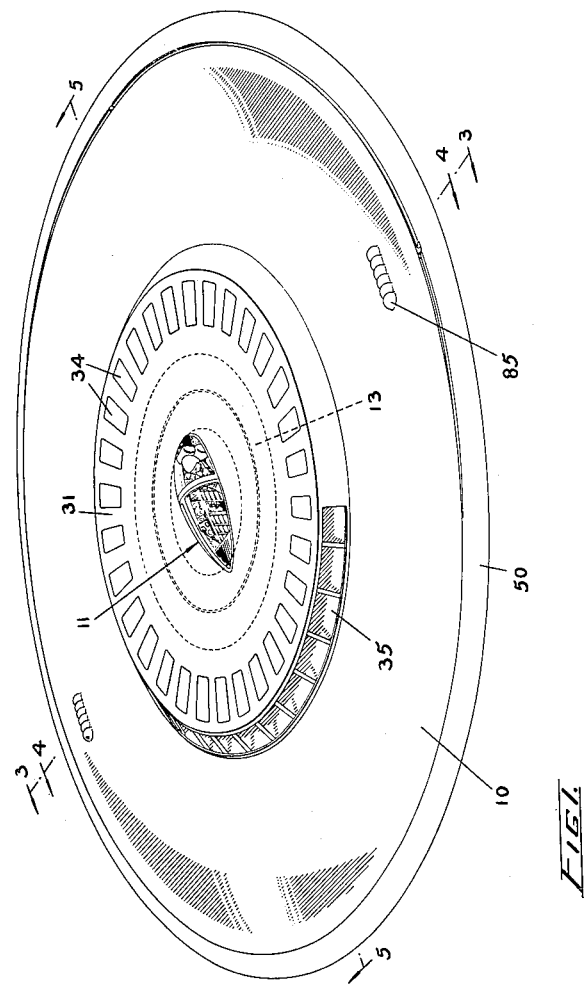
FIG. 1 is a perspective view of an aircraft which embodies the invention, and viewed from above.
Figure 2:
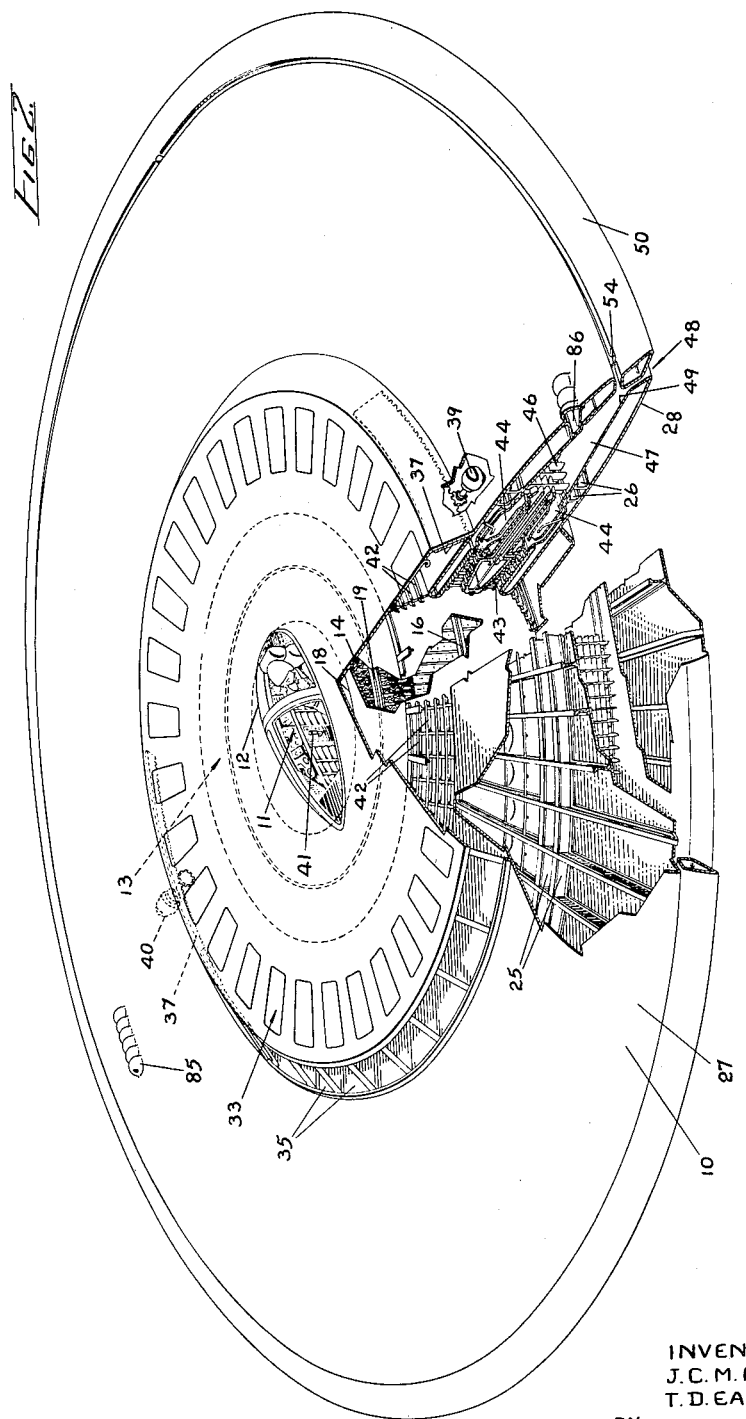
FIG. 2 is a perspective view of the said aircraft, partly broken away to show the internal construction.

For greater convenience, throughout the description certain terms of positional relationship are used. The terms "outboard" (or "outboardly") and "inboard" (or "inboardly") denote, respectively, greater and lesser distances from the axis of rotation of the rotor which constitutes the centre of the aircraft, and the terms "outer" and "inner" similarly denote greater and lesser distances from a medial plane between the areofoil surfaces, which plane substantially coincides with the plane of the rotor. The terms "vertical," "upwardly," and "downwardly" denote directions approximately normal to the aforesaid medial plane.

It is well known to those skilled in the art that a jet is deflected around the radius in a Coanda nozzle situated in still air by reason of the fact that a positive pressure differential exists between the extended wall of the nozzle and the atmosphere beyond the jet. As the jet issues from the orifice, it is in effect pushed against the extended wall by this difference in pressure, provided that the radius of the wall is not less than a predetermined minimum which is governed by the "effective" pressure of the atmosphere beyond the jet. For a nozzle situated in still air at atmospheric pressure, this radius must be of the order of three times the height or thickness of the orifice from which the jet issues. The radius of the extended wall correspondingly can be reduced for increases in the "effective" pressure beyond the jet: that is, if the "still air" pressure of the atmosphere beyond the jet increases, the required radius of the wall can be decreased correspondingly. Moreover, if a velocity is imparted to the still air at atmospheric pressure, the "effective" pressure is thereby increased, thus making possible the use of a wall having a smaller radius.

The aircraft of the invention is substantially circular in plan form, and in elevation it presents flat double convex surfaces on the central portion of each of which protrude frusto-conical structures; it can be said that the structure is of generally lenticular form, or is "lentiform."

An aircraft embodying the invention may comprise a central cylindrical shell 10 which houses a pilot's compartment 11 and in which are located the necessary flying instruments and controls. The pilot's compartment is covered by a sealable closure 12.

Encompassing the cylindrical shell 10 is an annular fuel tank generally indicated at 13, and which is constituted by radial baffles 14, an upper annular wall 15, an intermediate annular wall 16 and a lower annular wall 17, and by an inboard cylindrical wall 18, an intermediate cylindrical wall 19 and an outboard cylindrical wall 20.

Radially extending struts 21 are firmly secured to the outboard cylindrical wall 20 of the tank. Secured to the struts 21 are the inboard ends of an upper series of radially disposed ribs 22 and of a lower series of radially disposed ribs 23, an upper rib and the opposed lower rib which is spaced therefrom constituting a pair of ribs. The ribs of each pair are spaced adjacent their outboard ends by a circumferentially arranged group of outboard struts 24; circumferentially disposed stiffeners 25 and 26 are also provided between adjacent ribs.

An annular upper skin 27 is secured to the outer edges of the upper ribs 22, and a similar annular skin 28 is secured to the outer edges of the lower ribs 23. Extending outwardly from the inboard portion of the ribs 22 and 23 and of their skins 27 and 28 are sloping ribbed structures 29 and 30 which are covered respectively by skins 31 and 32; these skins extend inboardly to cover the annular fuel tank and the pilot's compartment. The portions of the aircraft covered by the skins 31 and 32 are frusto-conical, and the skins of these frusto-conical portions together with the skins 27 and 28 constitute the opposed aerofoil surfaces of the aircraft.

On the flat portion of the upper skin 31 are provided circumferentially arranged air inlets 33 which are normally closed by spring loaded doors 34. On the forward sectors of the sloping portions of the skins 31 and 32 are additional air inlets 35 and 36 adapted to be closed by sliding doors 37 and 38 respectively. The inner edges of the doors 37 and 38 are provided with gear teeth which mesh with pinions on the shafts of motors 39 and 40 operable by a suitable control 41 in the pilot's compartment.

In operation, air enters the inlets 33 or the inlets 35 and 36, is deflected inwardly by cascades 42, then after passing through a central plenum chamber it flows radially outboardly through a double-sided multi-stage compressor 43, then into an annularly disposed combustion system 44 where it supports combustion of the fuel supplied from the fuel tank to the nozzles 45. The products of combustion expand through a single-stage radial flow turbine 46 into an annular jet exhauster duct 47; the flow of products of combustion through the jet exhauster duct is in generally radial directions. The compressor and the turbine have a common rotor which in the construction illustrated is supported by radial load and axial load air bearings.

From the jet exhauster duct 47 the products of combustion pass through a perimetrical orifice or outlet 48 and thence to atmosphere to provide a propulsive thrust.

The orifice 48 and the exhauster duct 47 are constituted by spaced annular plates 49 secured to the inner edges of the ribs 22 and 23 respectively, and which at their outboard edges diverge to blend with the outboard edges of the skins 27 and 28.

The orifice 48 is substantially V-shaped in cross-section, and encompassing it is an annulus or annular plug 50. The cross-section of the annulus 50 and its diameter are so dimensioned that when the annulus is positioned concentrically in the orifice it may make circumferential contact with one of the orifice walls but be spaced from the opposed wall to define a passage. The inboard diameter of the annulus is less than the outboard diameter of the orifice so that outward movement of the annulus (i.e., movement in a direction normal to the medial plane between the aerofoil surfaces) is limited by the orifice walls. The annulus is diamond-shaped, and preferably its inboard faces are disposed at angles of say 60° relative to the medial plane, and its outboard faces are disposed at angles of say 30° relative to the medial plane. The inboard faces blend smoothly with the outboard faces to form continuous symmetrical upper and lower surfaces.

It will be seen from the drawings that the orifice 48 and the annulus 50 together constitute a bifurcated duct when the annulus is in the centralized position (i.e., coincides with the medial plane) so that the products of combustion are separated or bifurcated to form jets having opposed vertical components of thrust. When the annulus is moved outwardly from the centralized position a resultant vertical component of thrust will be produced in a sense opposite the sense of movement of the annulus relative to the centralized position. The edges of the orifice walls and of the annulus are radiused generously to provide corners around which the gases may bend in accordance with the Coanda effect.

Referring particularly to FIGS. 4, 5 and 6, the annulus 50 is provided at four points with supporting means whereby portions of it may be displaced outwardly relative to the orifice (i.e. in a direction normal to the medial plane between the aerofoil surfaces) and whereby it may also be displaced as a whole eccentrically relative to the orifice (i.e. in a direction parallel to the aforesaid medial plane).

Figure 3:
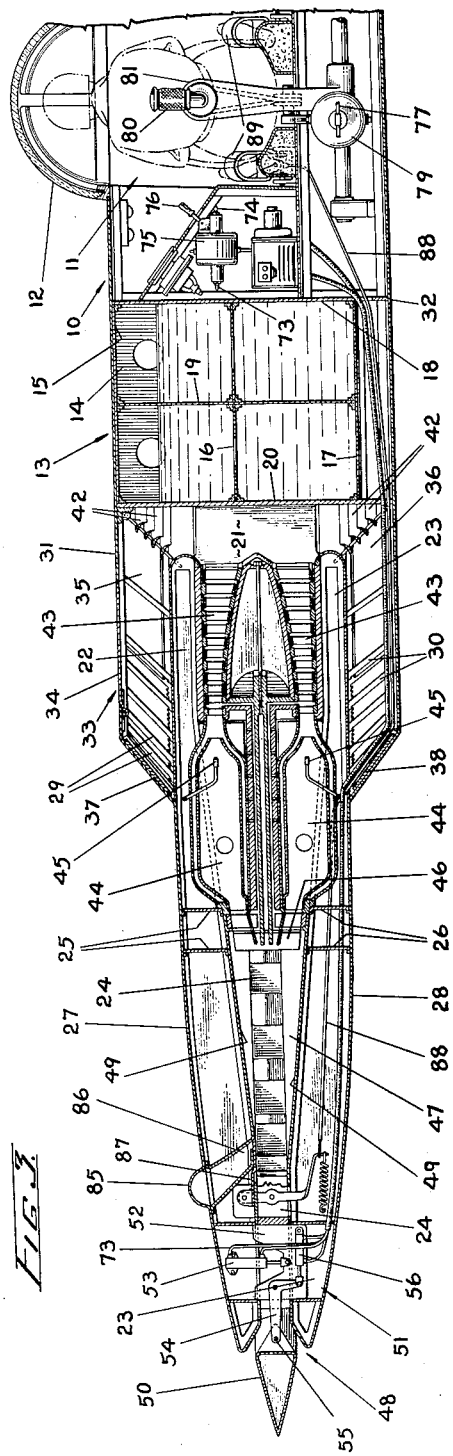
FIG. 3 is a radial sectional view of the aircraft taken substantially transversely of the direction of flight, and more particularly as indicated by lines 3—3 of FIG. 1.

The port supporting means generally indicated at 51 comprises a plate 52 slidably mounted in suitable guides under the control of a hydraulic jack 53, the body of the jack being anchored on a rib 22 and its piston being connected to the plate 52. Pivotally mounted on the plate 52 is a bell crank 54, one end of which is connected to the annulus 50 through a pin 55 spanning a slot in the annulus. The other end of the bell crank is pivotally connected to the piston of a jack 56, the body of the said jack being anchored on the plate 52. It will be apparent from an examination of FIG. 3 or 4 that actuation of the jack 53 will cause outward movement of a portion of the annulus relative to its centralized position in the orifice, whilst actuation of the jack 56 will cause movement of the said portion of the annulus 50 in an arc, the main component of motion being vertical (i.e., inwardly and outwardly).

The starboard annulus supporting means which is generally indicated at 57 is similar to the port supporting means. It includes a plate 58 adapted to slide vertically in suitable guides under the control of a hydraulic jack 59 which is anchored to a rib 22. It also includes a jack 60 coupled to a bell crank 61 which is connected to the annulus. The jacks 56 and 60 although connected in parallel move differentially, i.e. they cause the portions of the annulus to which they are connected to move in opposite senses.

The forward annulus supporting means generally indicated at 62 comprises a plate 63 mounted for sliding movement in suitable sloping guides under the control of a jack 64; the body of the jack is anchored on a rib 23, while its piston is connected to the plate 63. Pivotally mounted on the plate is a bell crank 65, one end of which is connected to the annulus 50 through a pin 66 which spans a slot in the annulus and the other end of which is connected to the piston of a jack 67 anchored on the plate 63.

When the piston of the jack 64 is positioned as shown in FIG. 5 it holds the forward portion of the annulus in centralized position relative to the orifice and also eccentrically relative thereto, thus sealing the forward portion of the orifice. If the jack 64 is actuated to shift its piston to the alternative position, the forward portion of the annulus will move to the position shown in chain dotted lines in FIG. 5, that is, it will move outwardly and outboardly relative to the orifice to assume a concentric position. When the piston of the jack 64 is in the said alternative position, actuation of the jack 67 will cause movement of the forward portion of the annulus in an arc, the main component of motion being vertical and in a downward sense; movement in an upward sense obviously is not possible. When the forward portion of the annulus is in the centralized position as shown in full lines in FIG. 5, the jack 67 is inoperative.

The aft annulus supporting means which is generally indicated at 68 is substantially similar to the forward supporting means 62. It includes a plate 69 mounted for sliding movement in suitable sloping guides under the control of a jack 70 anchored on a rib 22. It also includes a jack 71 coupled to a bell crank 72 which is connected to the annulus 50.

When the piston of the jack 70 is positioned as shown in FIG. 5 it holds the aft portion of the annulus in such a position that the annulus as a whole is eccentric relative to the orifice and the aft portion is in centralized position relative thereto; actuation of the jack 72 will cause movement of the aft portion of the annulus 50 in an arc, the main component of motion being vertical. If the jack 70 is actuated to shift its piston to the alternative position, the aft portion of the annulus will move outwardly relative to its centralized position and also inboardly to assume a concentric position relative to the orifice; when the piston of the jack 70 is in the said alternative position, the jack 71 may be actuated only to move the annulus inwardly.

The jacks 53, 59, 64 and 70 are connected in parallel and operable in unison. They are connected through hydraulic lines 73 and 74 to a suitable two-position servo motor 75 in the pilot's compartment and which is conditionable by a selector handle 76. The selector handle may be set at "flying position" as illustrated in FIG. 4, or at "take-off position." When the selector handle is at flying position the annulus 50 is in the position shown in full lines in the drawings, that is, it is disposed eccentrically relative to the orifice. If the selector handle 76 is moved to the alternative or take-off postion the servo motor 75 will cause the annulus 50 to move to the chain dotted position of FIGS. 4 and 5; the port and starboard portions of the annulus will move outwardly relative to the medial plane, whilst the forward portion will move outwardly and outboardly, and the aft portion will move outwardly and inboardly. Thus with the selector handle 76 in the take-off position the annulus is disposed concentrically relative to the orifice but outwardly relative to the medial plane to make circumferential contact with the upper wall of the orifice and to provide in co-operation with the lower wall a downwardly directed annular gap.

The forward jack 67 and the aft jack 71 are connected through hydraulic lines 77 and 78 to a multi-position servo motor 79 which is controlled by the lateral movements of a control handle 80 mounted on a control column 81. Since the details of construction of the control system and particularly of the servo motors are not essential parts of the invention, these features will not be described in detail. However, the operation of the control system easily may be understood by an examination of the drawings.

When the selector handle 76 is in flying position, movement of the control handle 80 towards starboard will apply pressure to the right-hand side of the piston of the aft jack 71 thus urging the aft portion of the annulus 50 downwardly so that the exhaust gases cause a resultant upward thrust on the aft portion of the aircraft. The movement of the control handle 80 towards starboard has no effect on the forward jack 67 when the selector handle 76 is in flying position since the forward portion of the annulus is then centralized in the orifice and in effect is wedged therein. When the selector handle 76 is in flying position, movement of the control handle 80 towards port will cause the aft portion of the annulus to move upwardly so that the exhaust gases cause a resultant upward thrust on the aft portion of the aircraft; the forward portion of the annulus does not move since it is wedged in the orifice.

When the selector handle 76 is in take-off position, movement of the control handle 80 to starboard will cause the aft portion of the annulus to move downwardly but will have no effect on the forward portion of the annulus, whilst movement of the control handle to port will cause the forward portion of the annulus to move downwardly but will have no effect on the aft portion of the annulus.

The port jack 56 and the starboard jack 60 are controlled by the fore and aft movement of the control column 81 which is connected by a suitable linkage to the control valve of a servo motor 82. Servo motor 82, which is similar in construction to the servo motor 79, is connected by hydraulic lines 83 and 84 to the jacks 56 and 60. The operation of these two jacks can best be understood if it is assumed that selector handle 76 is in flying position so that the annulus 50 is in the position shown in full lines in FIGS. 4 and 5. If the control column 81 is moved forwardly the port jack 56 will be actuated to move the port side of the annulus downwardly thus increasing the upward thrust of the exhaust gases on the port side of the aircraft, whilst the starboard jack 60 will be actuated to move the starboard side of the annulus upwardly, thus increasing the downward thrust of the gases on the starboard side of the aircraft. If the pilot pulls back the control column, the operation of the jacks 56 and 60 is reversed with a consequent reversal of the direction of the increased thrust on the sides of the aircraft.

When the selector handle 76 is in take-off position the upper inboard portion of the annulus 50 is in contact with the upper wall of the orifice. If the control column 81 is moved either forwardly or rearwardly from neutral position when the selector handle is in take-off position, either the port side or the starboard side of the annulus (depending on the direction in which the control column is moved) will move downwardly whilst the other side will be unable to move.

Rerawardly directed louvres 85 are provided in the upper aerofoil surface of the port and starboard sides of the aircraft. These louvres are connected by ducts 86 to the jet exhauster duct 47; thus a small fraction of the exhaust gases may be ejected to atmosphere through the louvres. The ducts may be opened or closed selectively by sliding shutters 87 which are linked by flexible actuating cables 88 to the respective rudder pedals 89 situated in the pilot's compartment. The additional thrust component caused by the exhaust gases ejected selectively through the port or starboard louvres 85 is sufficient to cause an unbalance of the forces about the yaw axis of the aircraft to provide directional control.

In operation, with the aircraft on the ground in a horizontal attitude, the pilot sets the control column 81 and the control handle 80 in central or neutral position so that the annulus 50 lies parallel to the medial plane of the aircraft. To take off, the selector handle 76 is placed at take-off position (the position opposite to that shown in FIG. 4) thus actuating the jacks 53, 59, 64 and 70 to locate the annulus in the position shown by chain dotted lines in FIGS. 4 and 5. The exhaust gases thus issue downwardly from the nozzle 48 providing a vertical component of thrust and the aircraft is borne vertically upwardly. The "ground cushion" effect as described in co-pending application Serial No. 502,156 is of assistance in causing take-off of the aircraft. The pilot, by controlling the engine output, is able to raise the aircraft from the ground in vertical ascent while the aircraft retains a horizontal attitude. In order to change from vertical take-off or hovering to forward slight, the selector handle 76 is moved gradually to flight position, thus operating the jacks 53, 59, 64 and 70 to move the forward portion of the annulus 50 inboardly with a consequential outboard movement of its aft portion and also to centralize the entire annulus relative to the medial plane. The annulus thus assumes the position shown in solid lines in FIGS. 4 and 5.

Lateral and longitudinal control of the aircraft is achieved through the manipulation of the control column 81 and of the control handle 80. It will be understood that, in aircraft of this type utilizing a radial flow gas turbine engine, the gyroscopic effect of the rotor must be considered when designing an effective control system. In this respect, it is well known to those skilled in the art, that in order to correct a movement which affects the stability of the aircraft, the correcting moment must be applied 90° to the movement affecting the stability, and in a sense depending on the direction of the rotor. It has been assumed herein that the engine rotor rotates anticlockwise; consequently, for example, an up force must be applied to the port side of the aircraft in order to correct for a downward movement of the forward side of the aircraft.

A forward movement of the control column 81 will actuate the jacks 56 and 60 to cause the port portion of the annulus to move downwardly and to cause the starboard portion to move upwardly, thus applying a downward force to the port side and an upward force to the starboard side and causing the aircraft to "nose down." The jacks 56 and 60 will operate in the reverse manner if the column is pulled back, thus causing the aircraft to "nose up." If the control handle 80 is moved towards port the aft jack 71 will move downwardly thus applying a downward force to the aft portion of the nozzle and causing the port side of the aircraft to tilt downwardly. If the control handle 80 is moved to starboard, the jack 71 will operate in the reverse manner thus causing the starboard side of the aircraft to tilt downwardly.

When the selector handle 76 is in take-off position the aircraft can be trimmed by the operation of the control handle 80 and of the control column 81 in the same manner as described above. Of course, when the selector handle 76 is in take-off position the upper face of the annulus 50 is in circumferential contact with the upper wall of the orifice 48 so that no portion of the annulus can move upwardly, but some portion of the annulus will move downwardly in response to any movement of the control handle 80 or of the control column 81.

By manipulation of the control handle 80 and of the control column 81 the annulus 50 may be moved in any direction relative to the orifice, within limits set mainly by its dimensions. In so doing it is possible to direct at least 80% of the jet in such a manner that it has a thrust component in the desired direction. In forward flight the remaining 20% of the thrust is recovered completely due to the Coanda principle of an attendant increase in the deflection of a jet around a wall when the effective pressure is increased.

It will be seen from the foregoing that by suitable movements of the annulus it is possible to accomplish all the control functions necessary to achieve complete control of the aircraft at all times.

The form of the invention herein shown and described is to be considered merely as an example. The details of construction of the engine do not form part of the invention, whilst the details of the control system are essentially schematic and by way of example only and are not an essential part of the invention. Obviously many changes in the construction shown not only are possible but may be desirable in order that the aircraft may have optimum performance. Such changes may, of course, be made without departing from the spirit of the invention or the scope of the subjoined claims.

What we claim as our invention is:

1. An aircraft comprising a lentiform structure, means for ejecting gases at high velocity from said aircraft through a substantially annular outlet generally encompassing the aircraft adjacent its outboard periphery, the gases being ejected in the form of a stream generally radial to the yaw axis of the aircraft at a multiplicity of positions distributed about the outlet, means for bifurcating said stream upon its ejection into two diverging streams and for directing said streams to have components of thrust parallel to said yaw axis but of opposite sense.

2. An aircraft as defined in claim 1 wherein said means for bifurcating said stream includes means for selectively reducing one of said two streams to zero to direct all of said gases into the other stream.

3. An aircraft as defined in claim 1 including means for varying the magnitudes of the two streams to thereby vary the relative magnitudes of said components.

4. An aircraft comprising a lentiform structure, means for ejecting gases at high velocity from said aircraft through a substantially annular outlet generally encompassing the aircraft adjacent its outboard periphery, the gases being ejected in the form of a stream generally radial to the yaw axis of the aircraft at a multiplicity of positions distributed about the outlet, means for bifurcating said stream upon its ejection into two diverging streams and for directing said streams to have components of thrust parallel to said yaw axis but of opposite sense, and means for varying the relative magnitudes of said components of thrust of the two streams.

5. An aircraft as defined in claim 1 wherein said means for bifurcating said stream comprises an annular member encompassing said outlet.

6. An aircraft as defined in claim 5 wherein said annular member is provided with at least one surface adjacent said outlet arranged at an angle to the plane of said stream.

7. An aircraft as defined in claim 5 wherein said annular member is provided with outwardly diverging surfaces adjacent said outlet arranged to deflect the gases of said stream into two streams having components of thrust parallel to said yaw axis, and means for moving said member to vary the relative magnitudes of said components of thrust.

8. An aircraft comprising a generally lentiform structure which is sheathed by opposed aerofoil surfaces which provide lift developing surfaces, engine means within the structure and embodying an air displacement passage having an intake and having walls defining an outlet adjacent the perimeter of the structure and from which the air is ejected, the outlet extending around the periphery of the aircraft, an annularly arranged member encompassing the outlet and positioned in the path of the ejected air, the member in co-operation with the walls of the outlet providing two nozzles through which the air is ejected with opposite components of thrust, and means to control the relative magnitudes of the opposite components of thrust of the air ejected through the nozzles.

9. An aircraft comprising a generally lentiform structure which is sheathed by opposed aerofoil surfaces which provide lift developing surfaces, engine means within the structure and embodying an air displacement passage having an intake and an outlet adjacent the perimeter of the structure and from which the air is ejected, the outlet extending around the periphery of the aircraft, a movable annularly arranged member encompassing the outlet, and means to adjustably position the member in the outlet to control the direction of flow of the ejected air to provide a propulsive thrust.

10. An aircraft comprising a generally lentiform structure which is sheathed by opposed aerofoil surfaces which provide lift developing surfaces, engine means within the structure and embodying an air displacement passage having an intake and an outlet adjacent the perimeter of the structure and from which the air is ejected, the outlet extending around the periphery of the aircraft, a movable annularly arranged member encompassing the outlet and against the surface of which the ejected air impinges, the impinged surface comprising two contiguous surfaces at an acute angle to each other, means controlling the position of the member relative to the outlet in a direction normal to the medial plane of the aircraft, and means for shifting the member relative to the outlet in directions parallel to the aforesaid medial plane.

11. An aircraft comprising a generally lentiform structure which is sheathed by opposed aerofoil surfaces which provide lift developing surfaces, engine means within the structure and embodying an air displacement passage having an intake and an outlet adjacent the perimeter of the structure and from which the air is ejected in generally radial directions, the outlet extending around the periphery of the aircraft and being defined by outboardly diverging opposed annular walls, a movable annularly arranged member encompassing the outlet, the cross-section of the member and its diameter being so dimensioned that when the member is positioned concentrically in the outlet it may make circumferential contact with one of the outlet walls but be spaced from the opposed wall to define therewith an outlet passage, and means to adjustably position the member in the outlet to control the direction of flow of the ejected air and thus provide a propulsive thrust.

12. An aircraft comprising a generally lentiform structure which is sheathed by opposed aerofoil surfaces which provide lift developing surfaces, engine means within the structure and embodying an air displacement passage having an intake and an outlet adjacent the perimeter of the structure and from which the air is ejected in generally radial directions, the outlet extending around the periphery of the aircraft and being defined by outboardly diverging opposed annular walls, a movable annularly arranged member encompassing the outlet, the cross-section of the member and its diameter being so dimensioned that when the member is positioned concentrically in the outlet it may make circumferential contact with one of the outlet walls but be spaced from the opposed wall to define therewith an outlet passage, means controlling the position of the member in the outlet in a direction normal to the medial plane between the aerofoil surfaces, and means for shifting the member eccentrically relative to the outlet.

13. An aircraft comprising a generally lentiform structure which is sheathed by opposed aerofoil surfaces which provide lift developing surfaces, engine means within the structure and embodying an air displacement passage having an intake and an outlet adjacent the perimeter of the structure and from which the air is ejected in generally radial directions, the outlet extending around the periphery of the aircraft and being defined by outboardly diverging opposed annular walls, a movable annularly arranged member encompassing the outlet, the cross-section of the member and its diameter being so dimensioned that when the member is positioned concentrically in the outlet it may make circumferential contact with one of the outlet walls but be spaced from the opposed wall to define therewith an outlet passage, and means to adjustably position the member in the outlet to control the direction of flow of the ejected air and thus provide a propulsive thrust, the member being positionable relative to an outlet wall to constitute therewith a Coanda nozzle.

14. An aircraft comprising a generally lentiform structure which is sheathed by opposed aerofoil surfaces which provide lift developing surfaces, engine means within the structure and embodying an air displacement passage having an intake and an outlet adjacent the perimeter of the structure and from which the air is ejected in generally radial directions, the outlet extending around the periphery of the aircraft and being defined by outboardly diverging opposed annular walls, a movable annularly arranged member encompassing the outlet, the cross-section of the member and its diameter being so dimensioned that when the member is positioned concentrically in the outlet it may make circumferential contact with one of the outlet walls but be spaced from the opposed wall to define therewith an outlet passage, supporting means for the member and conditionable to hold the member at a take-off position where the member is concentric with the outlet and at a flying position where the member is eccentric with the outlet, and pilot operated means to condition the supporting means.

15. An aircraft comprising a generally lentiform structure which is sheathed by opposed aerofoil surfaces which provide lift developing surfaces, engine means within the structure and embodying an air displacement passage having an intake and an outlet adjacent the perimeter of the structure and from which the air is ejected in generally radial directions, the outlet extending around the periphery of the aircraft and being defined by outboardly diverging opposed annular walls, a movable annularly arranged member encompassing the outlet, the cross-section of the member and its diameter being so dimensioned that when the member is positioned concentrically in the outlet it may make circumferential contact with one of the outlet walls but be spaced from the opposed wall to define therewith an outlet passage, supporting means for the member and conditionable to hold the member at a take-off position where the member is concentric with the outlet and at a flying position where the member is eccentric with the outlet, the supporting means including means for shifting the member relative to the outlet in a direction generally normal to the medial plane of the aircraft so as to trim the aircraft when the member is held concentrically or eccentrically by the supporting means.

16. An aircraft comprising a generally lentiform structure which is sheathed by opposed aerofoil surfaces which provide lift developing surfaces, engine means within the structure and embodying an air displacement passage having an intake and an outlet adjacent the perimeter of the structure and from which the air is ejected in generally radial directions, the outlet extending around the periphery of the aircraft and being defined by outboardly diverging opposed annular walls, a movable annularly arranged member encompassing the outlet, the cross-section of the member and its diameter being so dimensioned that when the member is positioned concentrically in the outlet it may make circumferential contact with one of the outlet walls but be spaced from the opposed wall to define therewith an outlet passage, means for movably supporting the member at each of its front, rear, and two side sectors, each of the said means comprising elements operable in unison to locate selectively the member at a take-off position where it is substantially concentric with the outlet and at a flying position where it is displaced eccentrically relative to the outlet in a rearward direction to seal the front portion of the outlet, and elements to shift the rear and the side sectors in a direction transverse to the medial plane of the aircraft so as to trim the aircraft, and pilot operated means for operating the elements.

17. An aircraft comprising a generally lentiform structure which is sheathed by opposed aerofoil surfaces which provide lift developing surfaces, engine means within the structure and embodying an air displacement passage having an intake and an outlet adjacent the perimeter of the structure and from which the air is ejected in generally radial directions, the outlet extending around the periphery of the aircraft and being defined by outboardly diverging opposed annular walls, a movable annularly arranged member encompassing the outlet, the cross-section of the member and its diameter being so dimensioned that when the member is positioned concentrically in the outlet it may make circumferential contact with one of the outlet walls but be spaced from the opposed wall to define therewith an outlet passage, means for movably supporting the member at each of its front, rear, and two side sectors, each of the said means comprising elements operable in unison to locate selectively the member at a take-off position where it is substantially concentric with the outlet and at a flying position where it is displaced eccentrically relative to the outlet in a rearward direction to seal the front portion of the outlet, an element to shift the rear sector in a direction transverse to the medial plane of the aircraft, elements to shift the side sectors in unison in a direction transverse to the aforesaid medial plane but in respectively opposite senses, and pilot controlled means for selectively operating the elements.

18. An aircraft comprising a generally lentiform structure sheathed by opposed lift developing surfaces, a gas displacement passage in the structure having an intake and having a substantially annular outlet adjacent to the periphery of the structure, the passage extending generally radially relatively to the yaw axis of the aircraft in a multiplicity of diverging directions, the annulus defining the outlet being disposed generally perpendicular to the yaw axis, means for impelling gas to flow through the passage from the intake to the outlet in a plurality of centrifugal directions relative to the yaw axis, and further means, associated with the outlet, for bifurcating the stream of gases passing through the outlet into two diverging streams and operable to direct said streams to provide components of thrust on the aircraft parallel to the yaw axis and of opposite sense.

19. An aircraft as defined in claim 18, wherein said means for bifurcating said stream includes means for selectively reducing one of said two streams to zero to direct all of said gases into the other stream.

20. An aircraft as defined in claim 18, including means for varying the magnitudes of the two streams to thereby vary the relative magnitudes of said components.

21. An aircraft as defined in claim 18, wherein said means for bifurcating said stream comprises an annular member encompassing said outlet.

22. An aircraft comprising a generally lentiform structure sheathed by opposed lift developing surfaces, a gas displacement passage in the structure having an intake and a substantially annular outlet adjacent to the periphery of the structure, the passage extending generally radially relatively to the yaw axis of the aircraft in a multiplicity of diverging directions, the annulus defining the outlet being disposed generally perpendicular to the yaw axis, means for impelling gas to flow through the passage from the intake to the outlet in a plurality of centrifugal directions relative to the yaw axis, further means, associated with the outlet, for bifurcating the stream of gases passing through the outlet into two diverging streams, said further means being operable to direct said streams to provide components of thrust on the aircraft parallel to the yaw axis and also to vary the relative magnitudes of said components of thrust.

23. An aircraft comprising a generally lentiform structure sheathed by opposed lift developing surfaces, a gas displacement passage in the structure having an inlet and a substantially annular outlet adjacent to the periphery of the structure, the passage extending generally radially relatively to the yaw axis of the aircraft in a multiplicity of diverging directions, the annulus defining the outlet being disposed generally perpendicular to the yaw axis, means for impelling air to flow through the passage from the intake in a plurality of centrifugal directions relative to the yaw axis, means for compressing the centrifugally flowing air, means for burning fuel in the compressed air, the combustion gases resulting from the burning of the fuel being emitted as a stream from the outlet, and further means, associated with the outlet, for bifurcating the stream of gases emitted from the outlet into two diverging streams and operable to direct said streams to provide components of thrust on the aircraft parallel to the yaw axis and of opposite sense.

References Cited in the file of this patent

UNITED STATES PATENTS

| | | |
|---|---|---|
| 2,008,464 | Nishi | July 16, 1935 |
| 2,465,457 | Johnston | Mar. 29, 1949 |
| 2,468,787 | Sharpe | May 3, 1949 |

FOREIGN PATENTS

| | | |
|---|---|---|
| 680,401 | France | Jan. 18, 1930 |